United States Patent [19]
Downey et al.

[11] Patent Number: 5,882,620
[45] Date of Patent: Mar. 16, 1999

[54] PYROMETALLURGICAL PROCESS FOR FORMING TUNGSTEN CARBIDE

[75] Inventors: Jerome P. Downey, Parker; Peter W. Siewert, Littleton, both of Colo.

[73] Assignee: International Carbitech Industries, Inc., Vancouver, Canada

[21] Appl. No.: 482,129

[22] Filed: Jun. 7, 1995

[51] Int. Cl.[6] .................... C01B 31/34; C22B 34/00
[52] U.S. Cl. .................... 423/440; 423/439; 423/53; 423/61
[58] Field of Search .................... 423/DIG. 12, 439, 423/440, 53, 61; 75/10.15, 10.18, 612, 622, 623

[56] References Cited

U.S. PATENT DOCUMENTS

| | | |
|---|---|---|
| Re. 32,612 | 2/1988 | Gomes et al. . |
| 667,705 | 2/1901 | Holloway et al. .................... 423/61 |
| 1,839,518 | 1/1932 | Woods et al. .................... 423/440 |
| 3,012,877 | 12/1961 | Foos et al. .................... 75/622 |
| 3,077,385 | 2/1963 | Robb .................... 423/440 |
| 3,256,057 | 6/1966 | Burwell . |
| 3,266,875 | 8/1966 | Romeo .................... 423/440 |
| 3,330,646 | 7/1967 | Heinen et al. .................... 423/439 |
| 3,373,097 | 3/1968 | Gomes et al. . |
| 3,589,987 | 6/1971 | Gomes et al. . |
| 3,676,105 | 7/1972 | McLeod et al. .................... 75/10.18 |
| 3,716,627 | 2/1973 | Middelhoek .................... 423/440 |
| 3,800,025 | 3/1974 | Fox .................... 423/61 |
| 4,190,439 | 2/1980 | Gortsema .................... 423/439 |
| 4,353,881 | 10/1982 | Quatrini et al. .................... 423/58 |
| 4,402,737 | 9/1983 | Kronenwetter et al. . |
| 4,489,044 | 12/1984 | Gomes et al. . |
| 4,504,461 | 3/1985 | Carpenter et al. . |
| 4,534,956 | 8/1985 | Arendt et al. .................... 423/DIG. 12 |
| 4,603,043 | 7/1986 | Douglas et al. .................... 423/61 |
| 4,629,503 | 12/1986 | Fruchter et al. .................... 423/61 |
| 4,752,456 | 6/1988 | Yoda et al. .................... 423/439 |
| 5,096,689 | 3/1992 | Terry et al. .................... 423/DIG. 12 |
| 5,102,646 | 4/1992 | Bienvenu .................... 423/439 |
| 5,188,810 | 2/1993 | Sommers .................... 423/439 |
| 5,372,797 | 12/1994 | Dunmead et al. .................... 423/439 |

FOREIGN PATENT DOCUMENTS

| | | | |
|---|---|---|---|
| 223726 | 8/1958 | Australia | 423/440 |
| 476496 | 8/1951 | Canada | 423/440 |
| 808370 | 2/1981 | U.S.S.R. | 423/61 |
| 954472 | 8/1982 | U.S.S.R. | 423/61 |
| WO 90/08103 A | 7/1990 | WIPO . | |

OTHER PUBLICATIONS

Kirk–Othmer Encyclopedia of Chemical Technology, Edition 3, vol. 23, 1987, Wiley & Sons, New York XP002062951, pp. 417–419.

John M. Gomes, Kenji Uchida, Don H Baker, Jr., "A High–temperature, Two–phase Extraction Technique for Tungsten Minerals", United States Department of the Interior, Bureau of Mines, Report of Investigations 7106, 1968, no month.

J.M. Gomes, A.E. Raddatz, T.G. Carnahan, "Preparation of Tungsten Carbide by Gas Sparging Tungstate Melts", Reno Research Center, Bureau of Mines, United States Department of the Interior, Presented at the 3rd International Tungsten Symposium, Madrid, Spain, May 13–17, 1985.

J.M. Gomes, A.E. Raddatz, T.G. Carnahan, "Preparation of Tungsten Carbide by Gas Sparging Tungstate Melts", Journal of Metals, pp. 29–32, Dec., 1985.

(List continued on next page.)

*Primary Examiner*—Steven Bos
*Attorney, Agent, or Firm*—Sheridan Ross, P.C.

[57] ABSTRACT

A process for forming a salt, such as sodium tungstate, using a pyrometallurgical operation is provided. A slagging operation is performed in which a metal-containing material is melted in the presence of slag formers such as sodium metasilicate and silica. The metal predominantly reports to a denser metal-containing phase. The denser metal-containing phase may then be subjected to gas sparging with a carbon-containing gas in order to form metal carbide, preferably tungsten carbide.

36 Claims, 4 Drawing Sheets

OTHER PUBLICATIONS

John M. Gomes, M.M. Wong, "Preparation of Tungsten Carbide by Electrodeposition", United States Department of the Interior, Bureau of Mines Report of Investigations 7247, 1969, no month.

John H. Gomes, Kenji Uchida, M.M. Wong, "Electrolytic Preparation of Tungsten Metal and Tungsten Carbide from Wolframite", United States Department of the Interior, Bureau of Mines Report of Investigations 7344, 1970, no month.

S. Hessel, B. Shpigler, O. Botstein, "A New Process for Production of Tungsten, Tungsten Carbide, and Tungsten Oxide Powders", Reviews in Chemical Engineering, vol. 9, pp. 345–364, No. 3–4, 1993, no month.

E. Vil'nianski and Z.L. Persits, "The Theory of the Soda–Silica Process for the Production of Sodium Tungstate From Scheelite", Journal of Applied Chemistry of the USSR, vol. 21, No. 5, pp. 663–667, May, 1958.

Metallurgy of Rare Metals, 2nd Ed., pp. 12–18, 24, 25, 1964, no month.

System Na$_2$O-SiO$_2$-WO$_3$. (A) 1200°C; (B) liquidus.

Schematic Diagram of the Pilot-scale Slagging System

Schematic Diagram of the Pilot-scale Sparging System

PYROMETALLURGICAL PROCESS FOR FORMING TUNGSTEN CARBIDE

FIELD OF THE INVENTION

The present invention is directed to the pyrometallurgical treatment of metal-containing materials and, in a preferred embodiment, the formation of tungsten carbide using a two stage pyrometallurgical process.

BACKGROUND OF THE INVENTION

Two stage processes for producing tungsten carbide (WC) are known. For example, in U.S. Pat. No. 3,373,097 entitled "Method For Separation Of A Metal-Containing Halide Phase From A Gangue-Containing Silicate Phase and Electrolysis of Halide Phase To Obtain The Metal" by Gomes et al., issued Mar. 12, 1968, a process for producing tungsten carbide is disclosed. The process involves a molten phase separation employing sodium chloride (NaCl) in which the tungsten reports to a less dense upper halide phase while impurity elements such as calcium, manganese and iron are recovered in a denser lower silicate phase. The separation is effected by heating a mixture of halide salts, concentrates of either scheelite ($CaWO_4$) or wolframite (($Fe,Mn)WO_4$), and a slag former such as sodium silicate to 900° C. to 1,100° C. After fifteen minutes to an hour at the elevated temperature, the phase separation is completed and the halide phase is decanted for processing by molten salt electrolysis.

U.S. Pat. No. 4,489,044 entitled, "Formation Of Tungsten Monocarbide From A Molten Tungstate-Halide Phase By Gas Sparging" by Gomes et al., issued Dec. 18, 1984, reissued as Re 32,612 on Feb. 23, 1988, discloses a process for producing tungsten carbide. The process involves the formation of a sodium chloride/sodium tungstate ($Na_2WO_4$) phase by molten phase separation, similar to the process described above. The tungsten monocarbide is produced by sparging the melt of sodium chloride and sodium tungstate with a hydrocarbon gas, particularly methane ($CH_4$) or natural gas. According to the disclosure, other alkali halides can be substituted for sodium chloride.

In May, 1985, Gomes, Raddatz and Caranahan made a presentation at the Third Tungsten Symposium in Madrid, Spain (May 13–17, 1985) regarding a two step technique for producing a granular tungsten carbide powder directly from scheelite or wolframite concentrates. The concentrates were first reacted at 1,050° C. with a sodium chloride/sodium metasilicate ($Na_2SiO_3$) melt. The reaction produces two immiscible liquids: a lighter tungstate-halide (NaCl—$Na_2WO_4$) phase containing 99 percent of the input tungsten and a denser silicate slag phase containing 90 to 96 percent of the iron, manganese and calcium oxides. After phase separation, the tungstate-halide phase is sparged with methane gas in a second step to yield granular tungsten carbide. The tungsten carbide is recovered from the reactor by decanting excess salt, cooling, water leaching and scraping. See "Preparation of Tungsten Carbide by Gas Sparging Tungstate Melts", Gomes et al., *Journal of Metals*, December 1985, pps. 29–32.

The processes described above all include an initial slagging operation in which a tungsten concentrate is combined with a siliceous flux and sodium chloride (other halide sources can be substituted). The tungsten compounds contained in the concentrate (e.g., calcium, iron, or manganese tungstates) react with the sodium chloride and the sodium silicate to produce two immiscible phases: a molten salt and a molten silicate slag. The tungsten preferentially reports to the molten salt phase, while the majority of the impurities are rejected to the slag phase. The viscous slag is more dense than the salt and settles to the bottom of the furnace crucible. The salt phase, which chiefly consists of sodium chloride and sodium tungstate, is forwarded to a second stage for processing into tungsten carbide.

A problem with the methods described above is that the lower density tungsten-containing phase also includes a halide salt (e.g., sodium chloride). During subsequent sparging operations, this halide salt volatilizes and deposits within various components of the gas handling system. This accretion of salt eventually leads to downtime in order to clear the obstructions. The sodium chloride also represents an operating cost. Additionally, the sodium chloride is extremely corrosive and its presence increases the cost of the materials due to the need to employ corrosion resistant materials and results in higher operating costs due to the corrosion. Furthermore, the sodium chloride dilutes the sodium tungstate in the sparging operation, effectively reducing the chemical activity of the tungstic oxide ($WO_3$).

It would be advantageous to provide a method for forming metal carbide (e.g., tungsten carbide) from a metal-containing mineral using a pyrometallurgical process. Additionally, it would be advantageous to form metal (e.g., tungsten) carbide without the need for forming a fused metal-halide salt. It would be advantageous to provide a process in which a majority of the tungsten input to the system is converted to tungsten carbide. It would be advantageous to provide a process in which tungsten carbide can be formed efficiently and economically without a large amount of system downtime.

SUMMARY OF THE INVENTION

In accordance with one embodiment of the invention, a method is provided for concentrating the metal in a metal-containing material by employing a pyrometallurgical operation. The pyrometallurgical operation includes a heating step in which the metal-containing material is heated in the presence of at least one sodium or potassium compound to melt the metal-containing material and form a high density metal-containing phase and a low density slag phase. The majority of the metal reports to the high density metal-containing phase. The two phases are immiscible and the high density metal-containing phase separates by gravity from the low density slag phase. Because of its higher density the high density metal-containing phase will settle to the bottom of a furnace crucible. The two phases can then be separated. Preferably, the high density metal-containing phase is subjected to a second pyrometallurgical operation, i.e., sparging with a carbon-containing gas, to form metal carbide.

Although the methods of the present invention have been found particularly applicable to tungsten-containing materials, the methods can be employed to recover other metals from metal-containing materials. Examples of such other metals are Group III-B metals (e.g., thorium), Group IV-B metals (e.g., titanium, zirconium, hafnium), Group V-B metals (e.g., vanadium, niobium, tantalum), Group VI-B metals (e.g., tungsten) and Group VII-B metals (e.g., manganese and rhenium). More preferred are refractory metals such as tungsten, titanium and tantalum. Most preferred are tungsten-containing materials. Examples of tungsten-containing materials include tungsten ores such as huebnerite ($MnWO_4$), scheelite ($CaWO_4$), ferberite ($FeWO_4$) and wolframite (($Fe,Mn)WO_4$). Additionally, the method of the present invention can be effective with other tungsten-containing materials such as flue dusts and various secondary materials (e.g., slag and scrap). While the methods of the present invention are useful in connection with a number of materials, for purposes of clarity, the following description will be of a preferred embodiment employing a tungsten-containing material. It is to be expressly understood that other materials, such as those listed above, can also be employed.

In accordance with another embodiment of the present invention, tungsten carbide is formed from a tungsten mineral concentrate. The tungsten mineral concentrate is heated in the presence of a sodium or potassium compound to a temperature from about 900° C. to about 1,200° C. in order to obtain a first melt. The first melt is maintained at temperature until it separates into a higher density tungsten-containing phase and a lower density slag phase. The higher density tungsten-containing phase is then separated from the lower density slag phase. The higher density tungsten-containing phase is heated to a temperature of about 1,050° C. to about 1,200° C. to obtain a second melt. Methane gas is then sparged through the second melt to form tungsten carbide. The tungsten carbide enriched portion of the second melt is removed and purified in order to obtain purified tungsten carbide. Preferably, the first melt is formed in the substantial absence of sodium chloride. In a preferred embodiment, a portion of a sparged, spent salt-containing material is recycled from the second melt to the first melt in order to aid in the separation of the higher density tungsten-containing phase from the lower density slag phase and to recycle tungsten not converted to tungsten carbide in the sparging stage.

DETAILED DESCRIPTION OF THE INVENTION

In accordance with one embodiment of the present invention, a pyrometallurgical process is provided for forming a tungstate salt, for example, sodium tungstate or potassium tungstate and preferably sodium tungstate, from a tungsten-containing material. Preferably, the tungsten-containing material is a tungsten ore such as huebnerite ($MnWO_4$), scheelite ($CaWO_4$), ferberite ($FeWO_4$) and wolframite (($Fe,Mn)WO_4$) or a tungsten-containing material such as flue dust and various secondary materials (e.g., slag and scrap). The pyrometallurgical slagging process comprises heating the tungsten-containing material in the presence of a slag forming silicate (preferably silica and an alkali metal silicate). The melt separates into two immiscible phases, a denser tungsten-containing phase, preferably sodium or potassium tungstate, and a less dense slag phase.

In accordance with another embodiment of the present invention, a process for forming tungsten carbide from a tungsten-containing material is provided. Preferably, the process includes two pyrometallurgical stages, a first slagging stage and a second sparging stage.

Figure 1:
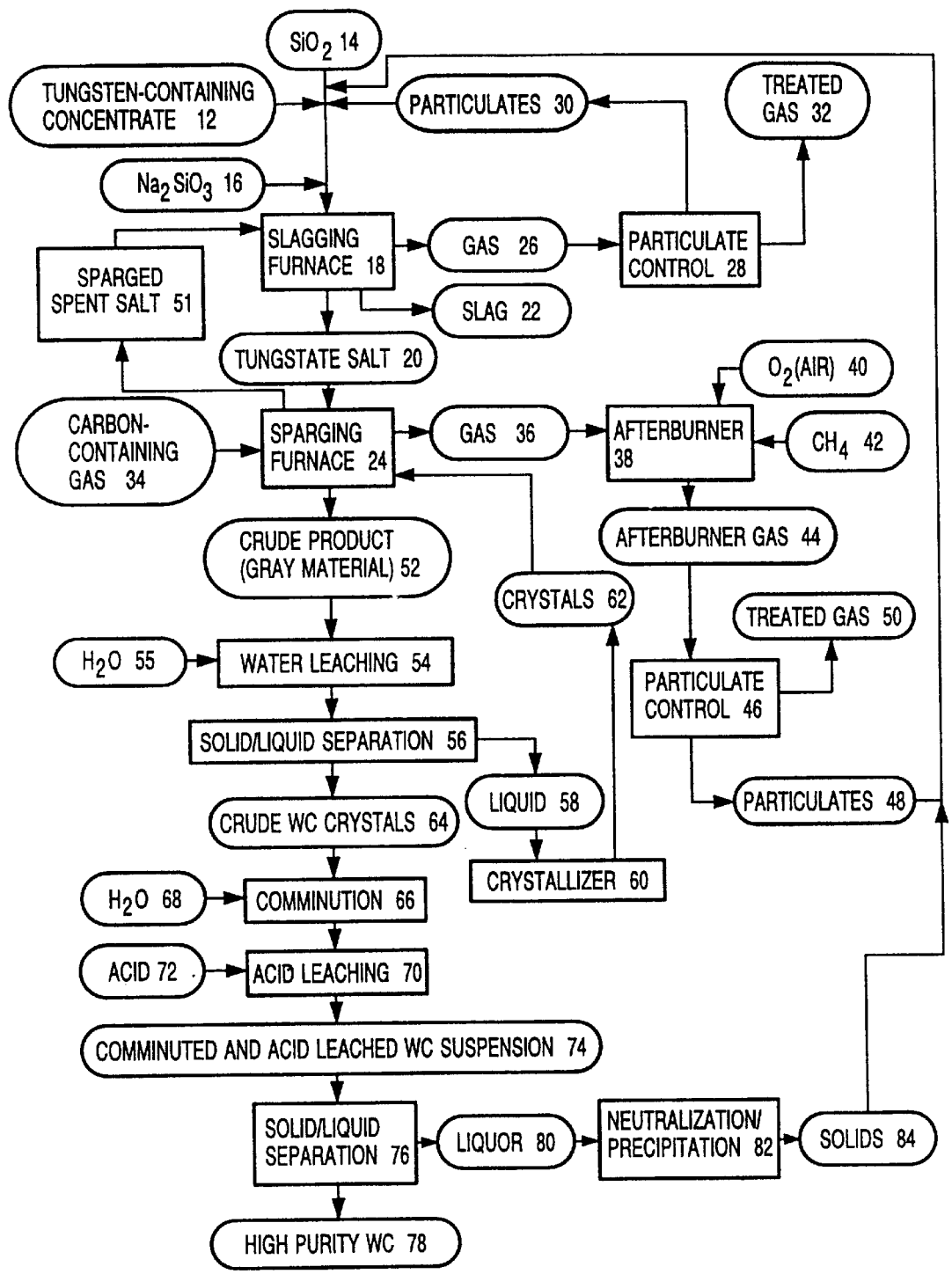
FIG. 1 is a flow diagram of one embodiment of the process of the present invention.

FIG. 1 illustrates a flow diagram of a preferred embodiment of the present invention. A tungsten-containing concentrate 12 together with silica 14 and sodium silicate 16 are introduced into a slagging furnace 18. The slagging furnace 18 is heated to a temperature in the range from about 900° C. to about 1,200° C., preferably from about 1,050° C. to about 1,150° C. and more preferably to approximately 1,050° C. for approximately 0.5 to 2.0 hours. The feed materials separate into two immiscible phases. A higher density tungsten-containing phase (tungstate) 20 settles to the bottom of the furnace crucible due to gravity and a less dense slag phase (silicate) 22 segregates to the upper portion of the furnace crucible. The higher density tungsten-containing phase 20 is introduced into a sparging furnace 24. The lower density slag phase 22 can be disposed of, or subjected to further treatment. The higher density tungsten-containing phase 20 can be separated from the lower density slag phase 22 by any number of appropriate processes. For example, the higher density phase 20 and lower density phase 22 can be poured sequentially from the mouth of a tilting or rotating furnace into separate appropriate vessels such as ladles. Alternatively, an outlet can be provided in the crucible to draw off the higher density tungsten-containing phase 20. Gas 26 from the slagging furnace 18 can be subjected to particulate control 28. The recovered particulate matter 30 can be recycled to the slagging furnace 18 and the treated gas 32 can be vented to the atmosphere.

The higher density tungsten-containing phase 20 is introduced into a sparging furnace 24. The higher density tungsten-containing phase 20 is heated to a temperature in the range of from about 1,050° C. to about 1,200° C., preferably from about 1,050° C. to about 1,150° C. and more preferably to a temperature of approximately 1,100° C. A carbon-containing gas 34, such as methane, is introduced into the sparging furnace 24. The carbon-containing gas 34 is cracked at the sparging furnace temperatures and the carbon is available for the formation of tungsten carbide. Gas 36 from the sparging furnace 24 can be subjected to an afterburner 38 with the addition of an oxygen-containing gas such as air 40 and a hydrocarbon, such as methane 42. The afterburner gas 44 can be subjected to particulate control 46. Recovered particulate matter 48 can be recycled to the slagging furnace 18 and treated gas 50 can be vented to the atmosphere. Sparged, spent salt 51 can be recycled to the slagging furnace 18.

The sparging step 24 results in a crude tungsten carbide product 52 which resembles a gray sintered material. The crude tungsten carbide product 52 is subjected to a water leaching step 54 after addition of water 55, followed by solid/liquid separation 56. The liquid portion 58 is fed to a crystallizer 60 and the crystals 62 can be recycled to the sparging furnace 24. The solid crude tungsten carbide crystals 64 are comminuted 66 in water 68 and subjected to acid leaching 70 with a suitable acid 72 (e.g., HCl). In a preferred embodiment, the comminution 66 and acid leaching 70 take place in a single operation. The comminution 66 is preferably conducted in a ball mill using tungsten carbide grinding media. The crude tungsten carbide crystals 64 are first slurried in a dilute aqueous 68 solution of hydrochloric acid 72, and the comminution 66 is continued for a period of time sufficient to liberate and solubilize impurities. The comminuted and acid leached suspension 74 is subjected to solid/liquid separation 76. The solid high purity tungsten carbide 78 preferably has a purity level of at least 90 percent tungsten carbide, more preferably at least 95 percent tungsten carbide, and more preferably at least 99 percent tungsten carbide. The liquor 80 is subjected to neutralization and precipitation 82 of solid materials 84. The solid precipitate 84, after drying, can be recycled to the slagging furnace 18.

In the first pyrometallurgical operation, a furnace charge consisting of a blend of tungsten concentrate and siliceous flux is treated at approximately 1,050° C. The tungsten compounds contained in the concentrate (e.g., calcium, iron, or manganese tungstates) react with the siliceous flux (preferably sodium silicate and silica) to produce two immiscible phases: a molten salt and molten silicate slag. The tungsten is preferentially segregated in the molten salt phase, while the majority of the impurities are rejected in the slag. The salt is more dense than the slag and settles to the bottom of the furnace crucible. The salt phase, which chiefly consists of sodium tungstate, is then forwarded to the second stage of pyrometallurgical processing, i.e., sparging.

The concentrate used in the examples contained huebnerite ($MnWO_4$) as the primary tungsten mineral. When a blended charge is treated as described above, the following chemical reaction ensues:

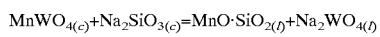

$$MnWO_{4(c)} + Na_2SiO_{3(c)} = MnO \cdot SiO_{2(l)} + Na_2WO_{4(l)}$$

Figure 2:
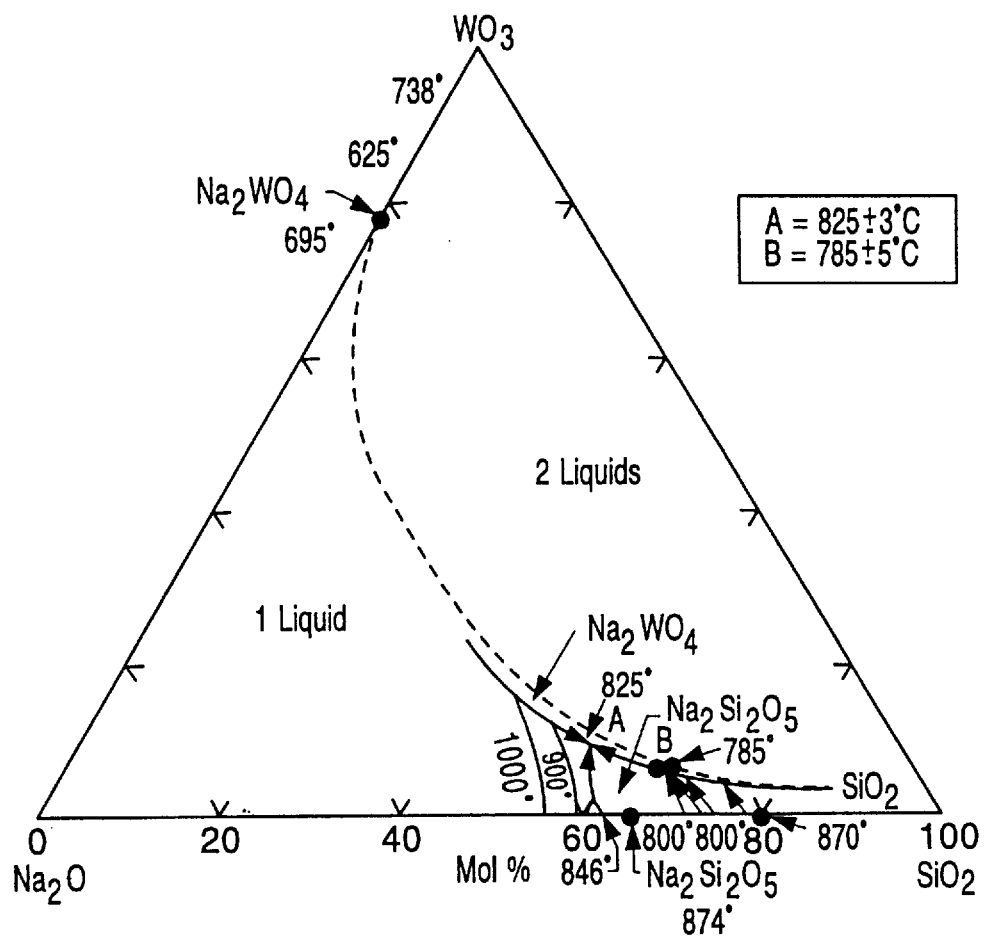
FIG. 2 is a ternary phase diagram of the $WO_3$—$Na_2O$—$SiO_2$ system at 1,200° C.

Segregation of the salt and slag phases is predicated upon the exploitation of the immiscibility region existing within the tungstic oxide-sodium oxide-silica system shown in FIG. 2. When the tungsten concentrates enter the 1,050° C. melt, they react with the sodium silicate to produce sodium tungstate and slag. At this temperature, the slag and tungstate are immiscible, and they separate by gravity.

The precise chemistry of the slag will depend upon the relative amounts of excess silica and sodium oxide in the system. Sodium oxide is a desirable slag constituent because its presence reduces the slag melting point sufficiently to ensure the formation of a completely liquid phase. In the absence of sodium oxide or another flux compound which will effectively lower the slag's melting point, a liquid slag cannot be formed in the manganese oxide-silica system at temperatures below approximately 1,250° C.

Figure 3:
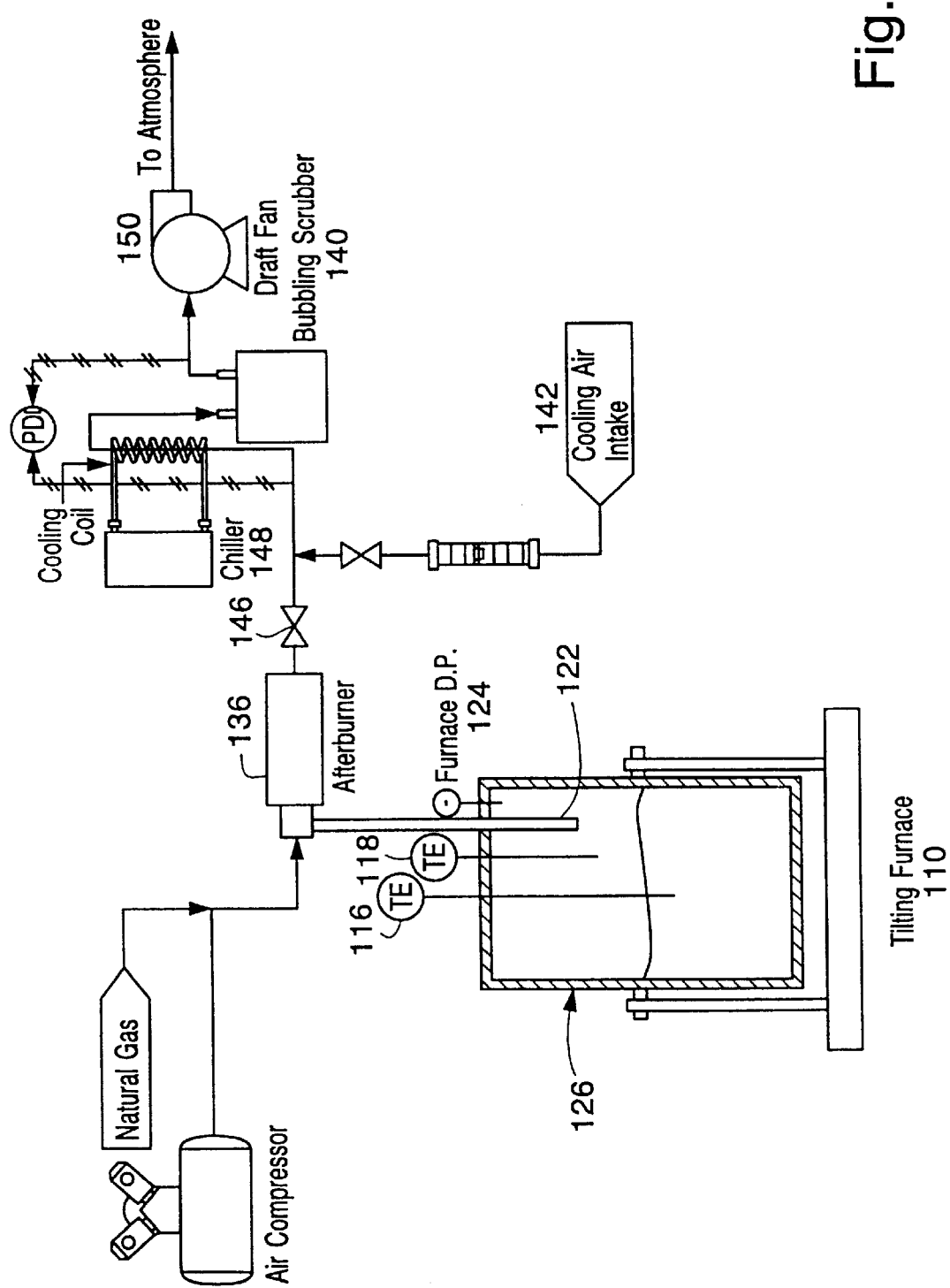
FIG. 3 is an illustration of a pilot scale slagging system in accordance with an embodiment of the present invention.

An example of a slagging system is illustrated in FIG. 3. With the exception of a gas injection system, the same basic furnace configuration useful in the sparging operation (described below) can be employed for the slagging operation. Because the slagging operation is simply a melting and separating exercise, no gas lances or nitrogen purge lines are required.

The second pyrometallurgical process effects the crystallization of tungsten carbide within the molten salt phase. This feat is accomplished by heating the tungsten-bearing molten salt from the first stage to within the range of approximately 1,080° to 1,100° C. and then sparging with a large stoichiometric excess of hydrocarbon gas, such as methane or propane. Under these conditions, the hydrocarbon gas cracks and provides the reductant and carbon source necessary for forming the tungsten carbide. The tungsten carbide phase forms as micron-sized crystals, which are insoluble in the molten salt phase. The crystals are also denser than the salt and are segregated near the bottom of the reactor. At the conclusion of the sparging operation, the spent salt is decanted from the crystals.

When methane is employed as the hydrocarbon source, the net chemical reaction leading to the formation of the tungsten carbide (WC) product is believed to be:

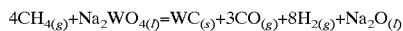

$$4CH_{4(g)} + Na_2WO_{4(l)} = WC_{(s)} + 3CO_{(g)} + 8H_{2(g)} + Na_2O_{(l)}$$

Because a large stoichiometric excess of hydrocarbon gas is needed, some of the excess gas also cracks to produce carbon and hydrogen gas, as illustrated by the following reaction:

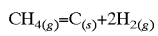

$$CH_{4(g)} = C_{(s)} + 2H_{2(g)}$$

The hydrogen gas and much of the elemental carbon are oxidized in the afterburner. However, some of the carbon remains as a contaminant within the salt phase. Thus, minimization of excess carbon formation in the sparging furnace is desirable.

Other hydrocarbon gases, such as propane or ethylene ($C_2H_4$), can be used in place of methane. For instance, the use of ethylene might enhance the sparging efficiency (i.e., increase the yield of tungsten carbide per unit of carbon added to the melt).

After separation of the free-flowing spent salt phase, the resultant tungsten carbide crystals are contained in a separate phase having a gray, sintered appearance. The gray material retains appreciable quantities of salt. The salt and other impurities are removed via a process of dry and/or wet grinding and sequential leaching in hydrochloric acid, caustic, and water. After this treatment, the resultant crystals can assay between approximately 99.3 and 99.4% tungsten carbide. However, the tungsten carbide produced in preliminary tests contains substantially higher impurity concentrations. The elevated impurity concentrations, mainly chromium and nickel, are believed to result from chemical attack of the fused salt on the reaction crucible.

An example of a suitable system for slagging (FIG. 3) and sparging (FIG. 4) includes a tilting furnace 110 with a cover at the top which has room for two sparging lances 112, 114, two thermocouples 116, 118, one dedicated nitrogen line 120, one exhaust line 122, and one pressure gauge 124. The main component is a 12.9 kW resistance-heated furnace 110. The furnace 110 has a hot zone 0.914 meter long by 12.7 cm diameter; it can attain a maximum operating temperature of about 1,200° C. Within the furnace shell, the process reaction vessel, or crucible 126, is constructed of 10.2 cm diameter Inconel 600 pipe; the maximum bath depth is about 45.7 cm. The crucible 126 may be removed for cleaning or maintenance by opening the hinged split shell furnace.

Figure 4:
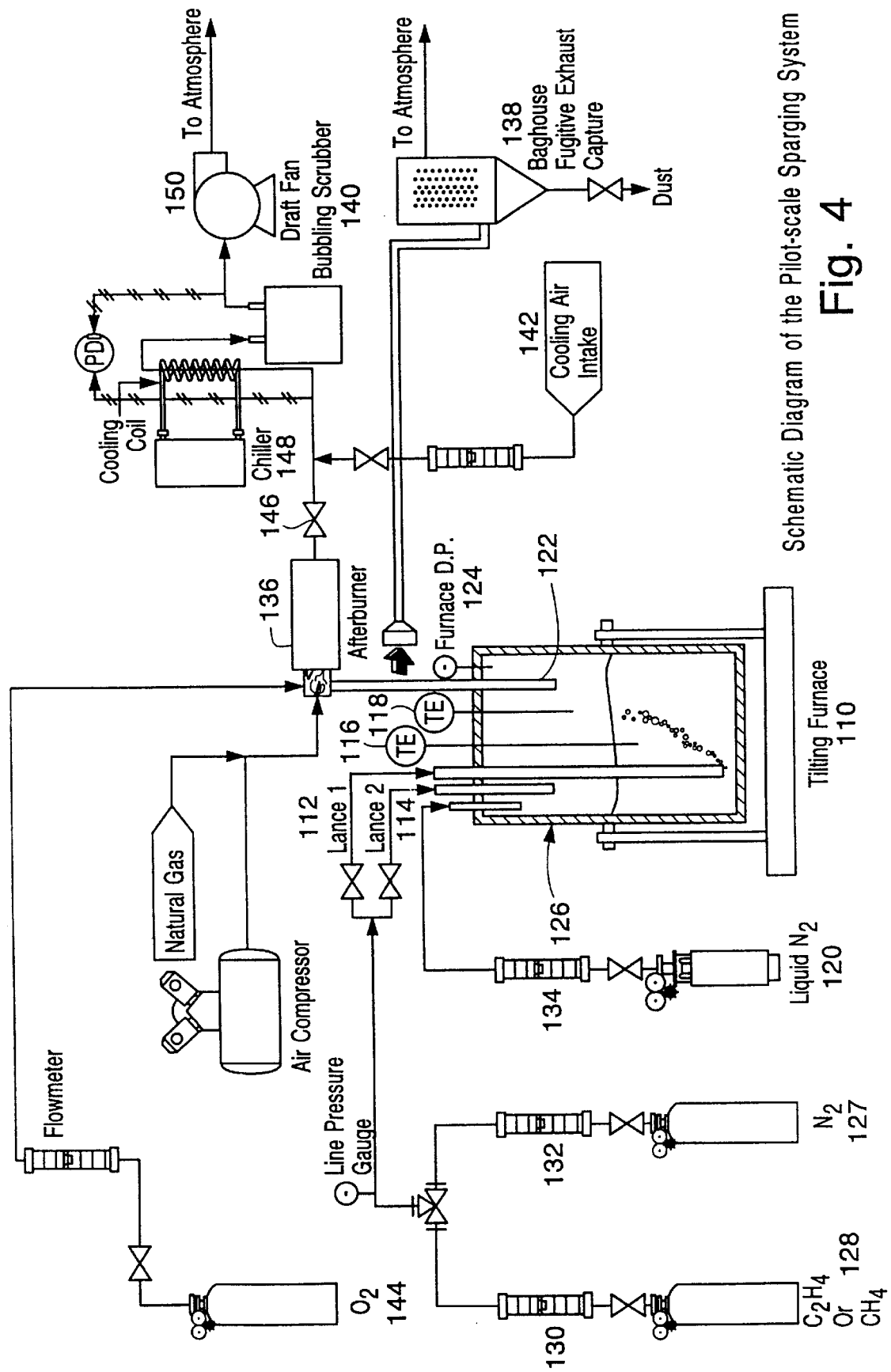
FIG. 4 is an illustration of a pilot scale sparging system in accordance with an embodiment of the present invention.

The same furnace can be employed for slagging (FIG. 3) and sparging (FIG. 4). In either slagging or sparging operations, the initial charge is typically added to the cold crucible 126, and then power is applied to the furnace 110 in order to elevate the bath temperature to the desired target. Subsequent charges can be made to the hot furnace 110. To facilitate removal of molten products, the furnace 110 can be tilted a full 180 degrees from its vertical operating position to pour products into ladles.

For operation in the gas sparging mode (FIG. 4), a facility was designed with the capability to purge the crucible 126 with nitrogen 127 and sparge the molten bath with methane, propane, ethylene or any mixture of these hydrocarbon source gases 128. Seven access ports are located in the reactor lid. Two of the ports admit gas lances 112, 114 during sparging operations. Hydrocarbon gases 128 are injected into the crucible 126 through one of the lances 112, with the other lance 114 held in reserve in case the first lance 112 becomes obstructed. Preferably, the lances 112, 114 have a relatively small inner diameter (e.g., 0.14 cm) to provide relatively high velocity flow, thus minimizing cracking in the lances 112, 114. The inlet hydrocarbon gases 126 are directly injected into the melt at a point approximately 5 cm above the crucible 126 bottom. During each sparging test, nitrogen 120 can also be injected through a third inlet port at a point approximately 2.5 cm below the reactor lid. The dedicated nitrogen lance 120 assures positive pressure inside the freeboard to prevent air from entering the crucible 126. All of the inlet gas flows are controlled by flow meters 130, 132, 134. Three other lid ports serve as thermocouple wells, and the main (central) port 122 serves as the process gas offtake.

A primary concern in the system design is to ensure efficient transport of the nascent hydrogen, which is formed by cracking or as a product of the sparging reaction to the afterburner 136. Preferably, in one embodiment, the pressure inside the furnace 110 is first adjusted to 0.25 to 0.50 millimeters (mm) of water by balancing the flow of reacting gas with the extraction draft. Then the pressure is increased to 2.5 to 5.0 mm of water by adjusting the flow of the dedicated nitrogen lance 120. Note that the tip of this lance 120 is positioned only about 5 cm from the top of the crucible 126 so that most of the draft is utilized to extract the reaction product gases and not nitrogen. In this way, most of the nitrogen flows through the top cover, maintaining an inert atmosphere at the top of the crucible 126 and preventing any air from contacting the product gases inside the furnace 110. The reaction gases are drawn into the afterburner 136 and combusted to $H_2O$ and $CO_2$. Carryover salt can be collected at the baghouse 138 or scrubber 140. The afterburner 136 offgases can be air cooled 142° to 120° C. before reaching the baghouse 138 or scrubber 140. When the baghouse 138 is employed, the gases go through the scrubbing system; then they can be discharged into the atmosphere. In the embodiment shown in FIG. 4, the afterburner 136 offgas passes through the scrubber 140, while the baghouse 138 is used to treat possible fugitive emissions from the furnace 110.

Process gases exit the crucible 126 through the single exit port 122 leading to the gas handling system. The gases are fed directly into a 20.3 cm diameter by 55.9 cm long natural gas-fired, stainless steel afterburner 136 through a 5 cm diameter pipe. The afterburner 136 is designed to operate with a pressure pilot burner which remains ignited throughout the tests. Oxygen 144 is fed into the afterburner 136 at a controlled rate for combustion of the nascent hydrogen, residual hydrocarbon gases, and carbon fines entrained in the offgas stream. After exiting the afterburner 136, the gases pass through a ball valve 146 (used to balance the system gas pressure profile) and then into the scrubber 140.

The scrubber 140 is constructed of a 208-liter polymer drum and polyvinyl chloride (PVC) piping. The scrubber is filled with approximately 114 liters of water; the afterburner discharge gases are bubbled into the reservoir to condense and remove any soluble material in the gas stream. The afterburner exhaust gases are cooled by air dilution 142 and by an external chiller coil system 148 before entering the scrubber 140. Gases are pulled through the scrubbing system by a 25 cm diameter blower 150. Exit gases from the blower 150 can be vented to the atmosphere.

An external baghouse 138 and blower assembly was set up to collect fugitive emissions from the crucible lid. The baghouse 138 was fitted with two inlet hoses, each 10.2 cm in diameter, that were placed near the crucible lid. Fugitive emissions were thus drawn into the baghouse 138, filtered, and then blown into the atmosphere.

Temperature was monitored at several key points throughout the system. Readings were measured by two thermocouples 116, 118 which are placed through two separate lid ports. One thermocouple 116 measured the melt temperature near the point of gas injection, while the other thermocouple 118 was used to monitor the temperature of the head space, or freeboard, in the crucible 126 above the melt.

EXAMPLES AND COMPARATIVE TESTS

The tungsten concentrate sample used in the following examples was shipped from a commercial source. The 817 kg sample was packed in two unlined 30 gallon metal drums. The contents of both drums were thoroughly blended together prior to initiating any testing. Approximately half of the sample was stored in a plastic-lined 55-gallon drum. The remaining half of the sample was split into lots of approximately 45 kg. Subsamples were drawn from three of the lots for comparative analysis to ascertain the efficiency of the blending operation. Duplicate samples were retained on inventory for verification analyses. The blended master samples were then stored in sealed containers pending their use in the various tests.

The three subsamples of the tungsten concentrate were initially screened by semiquantitative analytical methods, such as x-ray diffraction (XRD), x-ray fluorescence (XRF), and emission spectrography, to approximate its mineralogy and chemical composition. Subsequently, all major and minor components detected by the screening methods were analyzed by more exacting techniques, including wet quantitative analytical chemistry, atomic absorption spectroscopy (AA), and inductively-coupled plasma spectroscopy (ICP). In some cases, multiple analytical techniques were employed in order to firmly establish the chemical composition of the concentrate sample. In addition to the chemical analysis, the tungsten concentrate sample characterization also included a limited amount of physical characterization.

Comparative Tests A, B and C

Three comparative slagging tests, designated as A, B and C, were completed within a 5 kW induction furnace system. In view of the huebnerite mineralogy of the concentrate sample, the tests were performed to obtain a preliminary indication of the behavior of the $MnO$—$Na_2O$—$SiO_2$ system slag. The charge components included varying amounts of concentrate, sodium chloride, and slag-formers sodium silicate and silica. These were added according to the respective charge compositions detailed in Table I.

During these experiments, excessive salt fumes were evident at times, and thin layers of salt condensed on the internal surface of the dome of the bell jar induction furnace containment.

TABLE I

| Charge Compositions for Comparative Slagging Tests A, B and C | | | |
|---|---|---|---|
| Charge Component and Mass | Test A | Test B | Test C |
| Concentrate, g | 10.73 | 10.68 | 12.10 |
| NaCl, g | 16.36 | 16.40 | 18.64 |
| $Na_2SiO_3.9H_2O$, g | 23.03 | 28.93 | 16.89 |
| $SiO_2$, g | 3.36 | 3.37 | 0 |

Visual inspection of the slag and salt products indicated no problems with phase separation. The three slag samples had a vitreous appearance and were tinted green, ranging from light green in Test A to emerald green in Test C. Most of the sodium chloride was volatilized during the first test, leaving a deposit of dark solids on the slag surface. In the other two tests, the halide phase was off-white with a yellow tint on each surface. The slag and halide phase samples produced in each test were recovered and submitted for XRF analysis; the amount of halide phase recovered from Test A was insufficient for XRF analysis.

The XRF data, summarized in Table II, suggest that a favorable partitioning of the tungsten between the slag and the halide phase occurred in two of the three tests. The tungstic oxide ($WO_3$) concentrations in the slag samples generated in Tests A and C were 0.5 and 0.7%, respectively, while the tungstic oxide concentration in the B slag was 1.8%.

TABLE II

XRF Analysis of Slag Samples from Comparative Slagging Tests

| Compound | A Weight % | B Weight % | C Weight % |
|---|---|---|---|
| NaCl | 7.1 | 8.7 | 3.1 |
| $Al_2O_3$ | 3.5 | 2.6 | 1.2 |
| FeO | 0.7 | 0.5 | 0.9 |
| MnO | 14.4 | 10.2 | 28.7 |
| $Na_2O$ | 22.7 | 21.2 | 14.4 |
| $SiO_2$ | 47.7 | 51.2 | 42.4 |
| $WO_3$ | 0.5 | 1.8 | 0.7 |
| Total | 96.6 | 96.2 | 91.4 |

As shown in Table III, the halide phase samples from Tests B and C consisted primarily of chlorine, sodium, and tungsten. According to the XRF data, the halide phase samples from Tests B and C contained 39 and 40% tungstic oxide, respectively. The iron and manganese concentrations were each below 0.1% in both halide samples. Trace levels of several other elements were also detected.

TABLE III

XRF Analysis of Halide Phase Samples from Preliminary Slagging Tests

| Element | B Weight % | C Weight % |
|---|---|---|
| Cl | 46.5 | 44.5 |
| Na | 23.0 | 23.3 |
| W | 31.0 | 32.0 |
| Total | 100.5 | 99.8 |

Example 1

Sodium Tungstate Production

Example 1 is designed to demonstrate the feasibility of forming a discrete sodium tungstate phase in the absence of sodium chloride in the charge. For the test to be successful, it is necessary that the sodium tungstate and slag would be present as immiscible liquids at the temperature of interest. This test was conducted in a 5 kW induction furnace. This charge composition is presented in Table IV.

TABLE IV

Charge Components and Masses for Sodium Tungstate Production

| Charge Component and Mass | Example 1 |
|---|---|
| Concentrate, grams | 66.57 |
| NaCl, grams | 0 |
| $Na_2SiO_3$, grams | 62.16 |
| $SiO_2$, grams | 21.27 |
| Total, grams | 150.00 |

Visual inspection of the test products indicates the formation of two distinct phases, sodium tungstate and slag. The slag phase has a dark green appearance and is at the top, while the sodium tungstate phase is off-white and located at the bottom of the crucible. The fact that the sodium tungstate phase is located at the bottom of the crucible is due to its higher density and its immiscibility with the lower density slag phase.

Example 1 was conducted without difficulty and phase separation was excellent. The products of this experiment were submitted for analysis to determine their respective tungsten and manganese distribution between the two product phases. As shown in Table V, the analytical results for Example 1 confirmed the feasibility of favorable tungsten and manganese distributions between the slag and salt phases. Judging from these results, the separation of tungsten from the concentrate as sodium tungstate, in the absence of sodium chloride, presents an attractive alternative.

TABLE V

Analytical Results from Example I

| Charge Composition | | Chemical Analysis | | |
|---|---|---|---|---|
| Species | Weight % | Element | % in Salt | % in Slag |
| $Na_2SiO_3$ | 41.45 | Mg | 0.06 | 0.34 |
| $Sio_2$ | 14.17 | Na | 12.80 | 16.70 |
| $MnWO_4$ | 44.38 | W | 59.25 | 0.10 |
| | | Mn | 2.05 | 12.40 |
| | | Cl | | |
| | | Si | 0.21 | 19.50 |

Comparative Tests D, E. F and G

Variation of the Manganese-to-Sodium Silicate Ratio in the Charge

The objective of Comparative Test D is to evaluate the effect of a high manganese-to-sodium silicate ($Mn:Na_2SiO_3$) ratio on the distribution of tungsten and manganese between the slag and salt phases. While not wishing to be bound by any theory, it is believed that is important to maintain a certain level of sodium in the system. In conducting tests where the slag composition was the independent variable, the respective distribution of manganese between the salt and slag phases was adversely affected as the manganese oxide level of the slag increased. This problem became apparent when the molar ratio of manganese to sodium silicate in the charge was raised above 1. It is believed that this phenomena occurred because an insufficient amount of sodium was present to complete the following reaction:

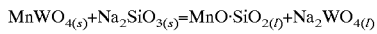

$$MnWO_{4(s)} + Na_2SiO_{3(s)} = MnO \cdot SiO_{2(l)} + Na_2WO_{4(l)}$$

If $Mn:Na_2SiO_3$ molar ratios of greater than one are desired to reduce flux consumption, additional sources of sodium are needed to maximize the formation of sodium tungstate and minimize the dissolution of unreacted manganese tungstate into the salt phase. The additional source of sodium utilized in this experiment was sodium hydroxide (NaOH) according to the composition presented in Table VI.

TABLE VI

Charge Composition for Test D

| Compound | Test D |
|---|---|
| Concentrate, grams | 41.23 |
| NaCl, grams | 64.33 |
| $Na_2SiO_3$, grams | 12.26 |
| NaOH, grams | 3.24 |
| Total, grams | 121.06 |

Although two distinct phases were again formed, the appearance of the slag was different than that observed in previous experiments. The slag in this test had a sandy appearance which, when observed under the microscope (30 x magnification), gave evidence of different phases and incomplete fusion of the charge. The halide phase had the same appearance as in the previous tests. As evidenced from the analytical results given in Table VII, the use of sodium hydroxide yielded unsatisfactory tungsten and manganese distributions in both the slag and salt phases.

Three additional induction furnace tests were conducted to further explore the effect of altering the $Mn:Na_2SiO_3$ ratio in the furnace charge, and to investigate the use of alternative sources of sodium and silica. The specific objective of Test E was to study the effects of a slag composition with a $Mn:Na_2SiO_3$ molar ratio of one on the distributions of tungsten and manganese between the halide and slag phases. As indicated in Table VII, the 0.55% concentration of tungsten in the slag and the 0.14% concentration of manganese in the halide indicate that reduction in flux consumption to realize a slag molar ratio of $Mn:Na_2SiO_3$ of less than or equal to one is feasible and worth pursuing.

In Test F, an attempt was made to increase the manganese:silicon ratio to 1.35, under conditions similar to those of Test D but using sodium carbonate ($Na_2CO_3$) instead of sodium hydroxide as the additional sodium source. The objective was to determine whether the choice of additional sodium source had any significant effect on the tungsten and manganese distributions. As seen in Table VII, a tungsten concentration of 1.08% in the slag suggests, when compared to 3.9% from Test D, that the source of additional sodium can have an effect on the distribution of tungsten in the halide phase.

In Test G the objective was to study the feasibility of using silica and sodium carbonate as the sole sources of sodium and silica in an attempt to substitute less expensive raw materials for sodium metasilicate. As shown in Table VII, the 0.13% tungsten concentration in the slag and the 0.03% manganese concentration in the halide suggested that the substitution is feasible.

TABLE VII

Analytical Results for Comparative Tests D, E, F, and G

| Test | Species | Charge Composition Weight % | Element | Chemical Analysis % in Salt | %/ in Slag | Comments |
|---|---|---|---|---|---|---|
| Comparative Test D | $Na_2SiO_3$ | 10.13 | Mg | 0.01 | 1.35 | NaOH used |
|  | $SiO_2$ | 0.00 | Na | 34.90 | 5.82 | as |
|  | $MnWO_4$ | 34.05 | W | 17.50 | 9.44 | additional |
|  | NaCl | 53.14 | Mn | 0.22 | 33.60 | sodium |
|  | NaOH | 2.68 | Cl | 46.00 | 0.75 | source for |
|  |  |  | Si | 0.19 | 11.90 | a basic slag. |
| Comparative Test E | $Na_2SiO_3$ | 20.24 | Mg | 0.01 | 0.69 | $Mn:Na_2SiO_3$ |
|  | $SiO_2$ | 0.00 | Na | 30.70 | 14.80 | molar ratio |
|  | $MnWO_4$ | 31.40 | W | 25.60 | 0.55 | of one in |
|  | NaCl | 48.36 | Mn | 0.14 | 24.50 | the slag. |
|  |  |  | Cl | 37.00 | 0.06 |  |
|  |  |  | Si | 0.12 | 12.30 |  |
| Comparative Test F | $Na_2SiO_3$ | 13.89 | Mg | 0.01 | 0.39 | $Na_2CO_3$ used |
|  | $SiO_2$ | 0.00 | Na | 30.30 | 11.10 | as |
|  | $MnWO_4$ | 32.56 | W | 23.40 | 1.08 | additional |
|  | NaCl | 50.28 | Mn | 0.10 | 32.70 | sodium |
|  | $Na_2CO_3$ | 3.27 | Cl | 38.00 | 0.39 | source |
|  |  |  | Si | 0.31 | 12.40 | (basic slag). |
| Comparative Test G | $Na_2SiO_3$ | 0.00 | Mg | 0.03 | 0.72 | $SiO_2$ and |
|  | $SiO_2$ | 18.85 | Na | 30.50 | 15.60 | $Na_2CO_3$ as |
|  | $MnWO_4$ | 24.20 | W | 23.60 | 0.13 | sole |
|  | NaCl | 37.36 | Mn | 0.03 | 13.20 | sources of |
|  | $Na_2CO_3$ | 19.59 | Cl | 40.50 | 0.10 | silicon and |
|  |  |  | Si | 0.17 | 16.95 | sodium. |

Example 2

In Example 2, no sodium chloride was included in the charge. The slag composition was selected to ensure the formation of two immiscible liquids. The formation of the two immiscible phases, as well as the favorable distributions of tungsten and manganese in the salt and slag, was predicted by the results of Example 1.

The mass balance for Example 2 is shown in Table VIII. The mass closure for this Example was 96.8%. A tungsten mass balance indicates that 92.9% of the charged tungsten reported to the halide phase and 3.3% to the slag. Only 3.8% of the tungsten in the charge was unaccounted.

TABLE VIII

Mass Balance for Slagging Example 2

| Material In | Kilograms | Material Out | Kilograms |
|---|---|---|---|
| Concentrate | 4.43 | Halide Phase | 3.94 |
| Silica | 1.41 | Slag | 5.74 |
| Sodium Metasilicate | 4.15 |  |  |
| Total | 10.00 | Total | 9.68 |

The tungsten distribution for Example 2, as calculated from the analytical data, indicates that approximately 97% of the input tungsten was segregated in the tungstate phase, with the difference reporting to the slag. While these results suggest that an efficient slagging operation in the absence of sodium chloride is indeed possible, those skilled in the art can improve the tungsten distribution without undue experimentation. Entrainment of salt from the reactor walls during slag pouring may have contributed to the relatively high tungsten concentration in the slag from Example 2.

From an operational point of view, although the sodium tungstate phase was segregated below the slag in the reactor (due to the higher density of the salt), it poured first, due to its lower viscosity and the geometry of the reactor. There were only a few minor traces of slag entrained in the salt, and these had floated to the surface before the salt solidified in the ladle.

Example 3

Recycling Sparged, Spent Salt to the Slagging Operation

This Example is designed to demonstrate the effectiveness of recycling the spent salt from the sparging unit operation to the slagging unit operation. This practice is desirable for two reasons. First, the spent salt typically contains an appreciable concentration of tungsten (approximately 15% by weight) which is not converted to tungsten carbide during the sparging step. Returning the salt to the slagging operation keeps the tungsten within the processing circuit and is useful in achieving economic levels of tungsten recovery in the overall operation. Second, it is believed that the sodium oxide in the sparged salt can serve as the sodium source in the production of sodium tungstate during the slagging operation. Therefore, recycling the spent salt is expected to reduce the consumption of raw materials. This Example was designed to determine whether recycling the spent salt would affect the distribution of tungsten between the salt and slag phases.

The Example consists of three charging cycles conducted sequentially. The Cycle 1 charge represents a typical slagging operation charge without salt recycled from the sparging operation and consists of a 5 kg blend of 26.3% huebnerite concentrate, 24.7% sodium metasilicate ($Na_2SiO_3$), 8.4% silica ($SiO_2$) and 40.6% sodium chloride (NaCl). The Cycle 2 charge consisted of 1 kg of spent salt (generated during a previous sparging test) plus 4 kg of the same components used in Cycle 1, mixed in the identical proportions. The Cycle 3 charge contained 2 kg of spent salt plus 4 kg of the components used in Cycle 1, again mixed according to the Cycle 1 proportions.

At the beginning of each test cycle, the charge materials were blended together, added to the furnace, and processed at a nominal temperature of 1,050° C. for one hour. The fused salt was then removed by tilting the furnace and pouring the melt into a ladle where it was allowed to solidify. The furnace was restored to its vertical operating position, and the process was repeated with the next charge. The slag phase was not removed until all three cycles had been completed. The slag was then poured into a ladle and allowed to solidify. Samples of the slag and of each of the three salt products were prepared and submitted for chemical analysis.

The analyses of the slag and salt products are summarized in Table IX. As calculated from the measured product weights and associated tungsten analyses, approximately 99.1% of the tungsten reported to the salt. Comparison of the salt analyses from Cycles 1, 2 and 3 indicates favorably low concentrations of impurities in all three cycles.

TABLE IX

Analytical Data from Spent Salt Recycling Tests

| Example 3 Sample Description | Sample Mass, kg | Al % | Cl % | Cr % | Fe % | Mn % | Na % | Ni % | Si % | W % |
|---|---|---|---|---|---|---|---|---|---|---|
| Cycle 1 Salt | 3.01 | 0.01 | 36 | <0.002 | <0.01 | 0.09 | 29.4 | 0.007 | <0.1 | 28.4 |
| Cycle 2 Salt | 3.57 | <0.01 | 40 | 0.003 | <0.01 | 0.04 | 31.5 | <0.002 | <0.1 | 21.9 |
| Cycle 3 Salt | 4.62 | 0.01 | 41 | <0.002 | <0.01 | 0.04 | 31.6 | <0.002 | <0.1 | 22.8 |
| Slag | 4.21 | 0.09 | 2.5 | 0.08 | 0.34 | 13.9 | 17.1 | 0.13 | 24.8 | 0.6 |

Examples 4 and 5

Sparging Sodium Tungstate to Produce Tungsten Carbide

It has been demonstrated that tungsten carbide of reasonably high purity can be obtained by sparging a molten mixture of sodium tungstate and sodium chloride with methane. However, elimination of the sodium chloride from the operation improves the process for several reasons. Consequently, two additional Examples are presented to demonstrate whether crystalline tungsten carbide powder can be produced by sparging molten sodium tungstate with methane gas.

In each Example, the initial melt consists of sodium tungstate produced in previous slagging tests. During the Examples, the sodium tungstate bath is maintained at approximately 1,100° C., while methane gas is injected below its surface at a flow rate of approximately 11.4 liters per minute. Methane sparging is continued for three hours in Example 4 and for 90 minutes in Example 5. At the conclusion of each Example, the molten products are poured into a steel ladle and allowed to solidify.

After the products have solidified and cooled sufficiently, two separate phases are observed: a white "spent ash" and a denser, medium gray phase. The two phases are separated and prepared for x-ray diffraction (XRD) analysis. The products from Example 4 were selected for the XRD analysis because they were more easily and cleanly separated after cooling. XRD analysis of the white spent salt indicates that it is predominantly composed of unreacted sodium tungstate ($Na_2WO_4$) with trace concentration of another unidentified crystalline phase. More significantly, the dense graph phase was found to contain sodium tungstate, with lesser concentrations of tungsten carbide (WC) and ditungsten carbide ($W_2C$) and trace concentrations of metallic tungsten and the same unidentified crystalline phase that occurred in the white salt.

Although those skilled in the art will be able to further optimize the process, the x-ray diffraction results demonstrate that it is possible to form tungsten carbide via the methane sparging method.

While various embodiments of the present invention have been described in detail, it is apparent that modifications and adaptations of those embodiments will occur to those skilled in the art. It is to be expressly understood, however, that such modifications and adaptations are within the scope of the present invention, as set forth in the following claims:

List of Reference Numerals

Tungsten-Containing Concentrate 12
Silica 14
Silicate 16
Slagging Furnace 18
Tungstate Salt 20
Slag 22
Sparging Furnace 24
Slagging Furnace Gas 26
Particulate Control 28
Particulates 30
Treated Gas 32
Carbon-Containing Gas 34
Sparging Furnace Gas 36
Afterburner 38
Oxygen-Containing Gas 40
Methane 42
Afterburner Gas 44
Particulate Control 46
Particulates 48
Treated Gas 50
Sparged, Spent Salt 51
Crude Tungsten Carbide Product 52
Water Leaching Step 54
Water 55
Solid/Liquid Separation 56
Liquid Portion 58
Crystallizer 60
Crystals 62
Solid Crude Tungsten Carbide Crystals 64
Comminution 66

Water 68
Acid Leaching 70
Acid 72
Comminuted and Acid Leached Suspension 74
Solid/Liquid Separation 76
High Purity Tungsten Carbide 78
Liquor 80
Neutralization and Precipitation 82
Solid Precipitate 84
Tilting Furnace 110
Sparge Lances 112, 114
Thermocouples 116, 118
Nitrogen Line 120
Exhaust Line 122
Pressure Gauge 124
Crucible 126
Nitrogen 127
Hydrocarbon Gas(es) 128
Flow Meters 130, 132, 134
Afterburner 136
Baghouse 138
Scrubber 140
Cooling Air Intake 142
Oxygen 144
Valve 146
Chiller Coil System 148
Blower 150

What is claimed is:

1. A method for forming tungsten carbide comprising the steps of:
   (a) heating the tungsten-containing material in the presence of an alkali metal compound at a temperature sufficient to melt said tungsten-containing material and for a time sufficient for the formation of a high density phase and a low density phase wherein the majority of said tungsten reports to said high density phase in the form of tungstate salt;
   (b) allowing said high density phase and said low density phase to separate by gravity wherein said high density phase settles to the bottom;
   (c) concentrating said tungsten by separating said high density phase from said low density phase;
   (d) producing tungsten carbide by subjecting said high density phase to sparging with a carbon-containing gas at an elevated temperature in order to form tungsten carbide; and
   (e) recycling a portion of a salt-containing material from the sparged high density phase of step (d) to a melt comprising tungsten-containing material in the presence of an alkali metal compound as described in step (a).

2. The method of claim 1, wherein said tungsten-containing material is selected from the group consisting of huebnerite ($MnWO_4$), scheelite ($CaWO_4$), ferberite ($FeWO_4$), wolframite ($(Fe,Mn)WO_4$) and mixtures thereof.

3. The method of claim 1, wherein said tungsten-containing material is selected from the group consisting of flue dusts, slags, scrap and mixtures thereof.

4. The method of claim 1, wherein said alkali metal compound is selected from the group consisting of sodium compounds and potassium compounds.

5. The method of claim 1, wherein said alkali metal compound is selected from the group consisting of sodium silicate, sodium carbonate, sodium hydroxide and mixtures thereof.

6. The method of claim 1, wherein said heating step (a) takes place at a temperature from about 900° C. to about 1,200° C.

7. The method of claim 1, wherein said heating step (a) takes place at a temperature from about 1,050° C. to about 1,150° C.

8. The method of claim 1, wherein said sparging step (d) takes place at a temperature from about 1,050° C. to about 1,200° C.

9. The method of claim 1, wherein said sparging step (d) takes place at a temperature from about 1,050° C. to about 1,150° C.

10. The method of claim 1, wherein said carbon-containing gas is a hydrocarbon gas.

11. The method of claim 1, wherein said carbon-containing gas is selected from the group consisting of methane, ethylene, propane and mixtures thereof.

12. The method of claim 1, wherein said high density phase is separated from said low density phase by pouring said high density phase from a crucible.

13. The method of claim 1, wherein said high density phase is removed through an outlet in a crucible containing said high density phase and said low density phase.

14. The method of claim 1, wherein said tungsten carbide formed in step (d) is separated from the remainder of materials and purified.

15. The method of claim 14, wherein said tungsten carbide is at least 90 percent pure after it is purified.

16. The method of claim 1, wherein said heating step (a) is performed in the substantial absence of halide salt.

17. The method of claim 5, wherein said salt-containing material which is recycled comprises materials selected from the group consisting of sodium tungstate, $Na_2O$ and mixtures thereof.

18. A method for forming tungsten carbide comprising the steps of:
   (a) heating a tungsten mineral concentrate in the presence of a sodium or potassium compound to a temperature from about 900° C. to about 1,200° C. in order to obtain a first melt;
   (b) maintaining said first melt at a temperature of from about 900° C. to about 1,200° C. until said melt separates into a higher density tungsten-containing phase and lower density slag phase, wherein in at least 80% of the tungsten in said tungsten mineral concentrate reports to said higher density tungsten-containing phase;
   (c) separating said higher density tungsten-containing phase from said lower density slag phase;
   (d) heating said higher density tungsten-containing phase to a temperature of from about 1,050° C. to about 1,200° C. to obtain a second melt;
   (e) sparging methane gas through said second melt to form a sparged second melt comprising tungsten carbide;
   (f) separating a tungsten carbide enriched portion from said sparged second melt; and
   (g) purifying said tungsten carbide enriched portion in order to obtain purified tungsten carbide.

19. The method of claim 18, wherein said first melt is formed in the substantial absence of sodium chloride.

20. The method of claim 18, wherein a portion of a salt-containing material is recycled from the second melt to a first melt as described in step (a) in order to aid in the separation of said higher density tungsten-containing phase from said lower density slag phase.

21. The method of claim 18, wherein said higher density tungsten-containing phase comprises a tungsten oxide salt.

22. The method of claim 18, wherein said higher density tungsten-containing phase comprises sodium tungstate salt.

23. The method of claim 18, wherein said lower density slag phase comprises a silicate.

24. The method of claim 18, wherein said lower density slag phase comprises manganese silicate, iron silicate or aluminum-calcium silicates.

25. The method of claim 18, wherein said tungsten carbide is produced in a fine size with at least 90 percent of said tungsten carbide having an average diameter of less then 10 microns.

26. The method of claim 18, wherein at least 95 percent of the tungsten in said tungsten mineral concentrate reports to said higher density tungsten-containing phase.

27. The method of claim 18, wherein at least 97 percent of the tungsten in said tungsten mineral concentrate reports to said higher density tungsten-containing phase.

28. The method of claim 18, wherein at least a portion of said sodium compound is in a form selected from the group consisting of: (i) sodium silicate ($Na_2SiO_3$); or (ii) sodium carbonate ($Na_2CO_3$) in the presence of silica ($SiO_2$).

29. The method of claim 18, wherein said purifying step (g) comprises:
(a) dry grinding, air elutriation and dry separation of melt from tungsten carbide;
(b) water leaching said dry purified material;
(c) subjecting said water leached material to solid/liquid separation to form crude tungsten carbide crystals;
(d) comminuting and acid leaching said crude tungsten carbide crystals; and
(e) subjecting said comminuted and acid leached crude tungsten carbide crystals to solid/liquid separation to obtain high purity tungsten carbide.

30. The method of claim 18, wherein said purified tungsten carbide is at least 90 percent tungsten carbide.

31. The method of claim 20, wherein said salt-containing material which is recycled comprises materials selected from the group consisting of sodium tungstate, $Na_2O$ and mixtures thereof.

32. The method of claim 29 wherein liquid which is separated in step (c) is fed to a crystallizer and the crystals are recycled to said second melt.

33. A method for forming tungsten carbide comprising the steps of:
(a) heating a tungstate salt to a temperature greater than its melting temperature to form a melt in the substantial absence of any halide salt such that the melt separates into a high density phase and a low density phase wherein the majority of the tungsten reports to said high density phase;
(b) sparging a hydrocarbon gas through said high density phase to form tungsten carbide; and
(c) separating said tungsten carbide from the remainder of said high density phase.

34. The method of claim 33, wherein said tungstate salt comprises sodium tungstate.

35. The method of claim 34 wherein a portion of said remainder of said high density phase of step (e) is recycled to a melt as set forth in step (a).

36. A method for forming tungsten carbide comprising the steps of:
(a) heating a tungsten mineral concentrate in the presence of a sodium or potassium compound and in the substantial absence of sodium chloride to a temperature from about 900° C. to about 1,200° C. in order to obtain a first melt;
(b) maintaining said first melt at a temperature of from about 900° C. to about 1,200° C. until said melt separates into a higher density tungsten-containing phase and lower density slag phase;
(c) separating said higher density tungsten-containing phase from said lower density slag phase;
(d) heating said higher density tungsten-containing phase to a temperature of from about 1,050° C. to about 1,200° C. to obtain a second melt;
(e) sparging methane gas through said second melt to form a sparged second melt comprising tungsten carbide;
(f) separating a tungsten carbide enriched portion from said sparged second melt; and
(g) purifying said tungsten carbide enriched portion in order to obtain purified tungsten carbide.

* * * * *